United States Patent
Kleven et al.

(10) Patent No.: US 7,458,275 B2
(45) Date of Patent: Dec. 2, 2008

(54) WELDED HEADER FOR PRESSURE TRANSMITTER

(75) Inventors: Lowell A. Kleven, Eden Prairie, MN (US); Mark G. Romo, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/724,618

(22) Filed: Mar. 15, 2007

(65) Prior Publication Data

US 2008/0229838 A1    Sep. 25, 2008

(51) Int. Cl.
*G01L 9/00* (2006.01)
(52) U.S. Cl. .......................................... 73/756; 73/745
(58) Field of Classification Search ................... 73/753, 73/756, 745
See application file for complete search history.

(56) References Cited

U.S. PATENT DOCUMENTS

| | | | | |
|---|---|---|---|---|
| 2,680,632 | A * | 6/1954 | Spieth ..................... | 285/130.1 |
| 4,168,630 | A | 9/1979 | Shirouzu et al. ............. | 73/727 |
| 4,427,842 | A | 1/1984 | Anderson .................... | 174/77 |
| 4,612,227 | A | 9/1986 | Lam et al. ................... | 728/137 |
| 4,675,643 | A | 6/1987 | Tanner et al. ................. | 338/4 |
| 4,970,898 | A | 11/1990 | Walish et al. ................ | 73/706 |
| 4,994,781 | A | 2/1991 | Sahagen ...................... | 338/47 |
| 5,287,746 | A * | 2/1994 | Broden ........................ | 73/706 |
| 5,670,722 | A | 9/1997 | Moser et al. .................. | 73/756 |
| 5,731,522 | A * | 3/1998 | Sittler ......................... | 73/708 |
| 6,050,145 | A | 4/2000 | Olson et al. .................. | 73/706 |
| 6,487,912 | B1 | 12/2002 | Behm et al. .................. | 73/753 |
| 6,511,337 | B1 | 1/2003 | Fandrey et al. .............. | 439/320 |
| 6,782,754 | B1 * | 8/2004 | Broden et al. ................ | 73/753 |
| 6,907,789 | B2 | 6/2005 | Bodin ......................... | 73/753 |
| 7,036,381 | B2 * | 5/2006 | Broden et al. ................ | 73/708 |
| 7,057,247 | B2 | 6/2006 | Kurtz et al. .................. | 257/419 |
| 7,258,021 | B2 * | 8/2007 | Broden ........................ | 73/756 |
| 7,287,432 | B2 * | 10/2007 | Schnaare et al. ............. | 73/706 |
| 7,373,831 | B2 * | 5/2008 | Broden ........................ | 73/715 |
| 2004/0226383 | A1 | 11/2004 | Romo ......................... | 73/729.2 |
| 2005/0248434 | A1 | 11/2005 | Kurtz et al. .................. | 338/42 |

OTHER PUBLICATIONS

Notification of Transmittal of the International Search Report and the Written Opinion for PCT/US2008/002849, dated Sep. 22, 2008.

* cited by examiner

*Primary Examiner*—Andre J Allen
(74) *Attorney, Agent, or Firm*—Westman, Champlin & Kelly, P.A.

(57) ABSTRACT

A pressure transmitter comprises a metal wall separating a process pressure chamber from an electronics compartment. The metal wall has a stepped bore with a bore shelf facing the process pressure chamber. A metal header has a stepped outer rim with a header shelf that contacts the bore shelf. The metal header includes at least one electrical feedthrough with a glass-to-metal seal adjacent the stepped outer rim. A welded seal seals the stepped outer rim to the stepped bore.

28 Claims, 5 Drawing Sheets

WELDED HEADER FOR PRESSURE TRANSMITTER

BACKGROUND OF THE INVENTION

The present invention relates to industrial processes. More specifically, the invention relates to pressure transmitters used in such processes.

In process pressure instruments, headers are used to pressure-isolate process pressure from electronic circuits while providing for electrical feedthrough connections between electronics which are at atmospheric pressure and a pressurized sensor. The term "header" as used in this application refers to a base that supports hermetically sealed, electrically insulated leads. Deeply penetrating metal welds are often used to seal header joints. The deep penetration of the weld helps ensure a hermetic seal at the weld. The weld also provides sufficient mechanical strength to prevent cracking at the weld.

A large amount of heat is generated in making deeply penetrating welds. Such heat can damage the electrical feedthrough connections. To avoid heat damage to the electrical feedthrough connections, headers typically have large diameters so there is sufficient spacing between the welds and the feedthroughs to provide for adequate heat dissipation.

As pressure sensing devices are increasingly miniaturized, there is a desire to miniaturize the headers. Heat damage, however, has prevented adequate advances in header miniaturization.

SUMMARY

A pressure transmitter includes a metal wall which separates a process pressure chamber from an electronics compartment. The metal wall has a stepped bore through it. The stepped bore includes a bore shelf facing the process pressure chamber. A metal header has a stepped outer rim with a header shelf that contacts the bore shelf. A welded seal preferably seals the stepped outer rim to the stepped bore.

DETAILED DESCRIPTION

Figure 1:
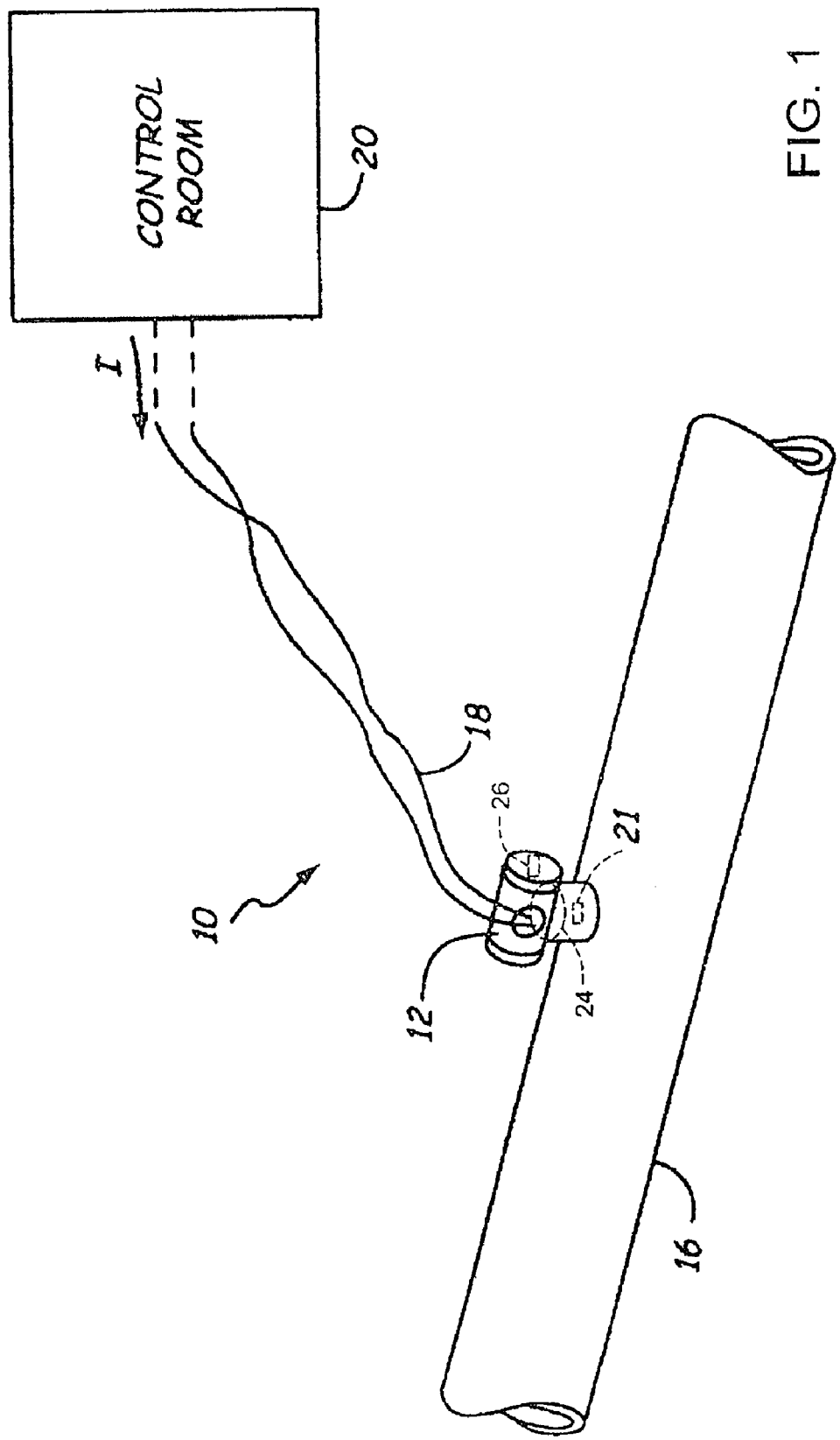
FIG. 1 illustrates a pressure transmitter mounted to a pressurized process pipe.

The present invention provides a configuration in a pressure transmitter in which the size of the header weld can be reduced. This reduces the amount of heat that is required to form the weld.

In the embodiments described below, a metal header is provided in a pressure transmitter with a stepped outer rim. The stepped outer rim has a header shelf between a larger rim diameter and a smaller rim diameter. The metal header includes a central plate with one or more feedthrough holes passing through the central plate. Metal pins, which are electrical connections, pass through the feedthrough holes. The metal pins are sealed to the holes with a glass-to-metal seal. The feedthrough holes are placed in close proximity to the outer rim.

The metal header fits into a stepped bore of a metal isolation wall of a pressure transmitter. The stepped bore includes a bore shelf. The stepped outer rim is welded to the stepped bore with one or more shallow welds to provide a seal. When process pressure is applied, a force is exerted on the metal header. The header shelf presses against the bore shelf and transfers substantially all of the force to the metal isolation wall. The shallow welds are relieved from the force on the header. The shallow welds are formed using little heat, and there is no damage to glass-to-metals seals from welding heat.

In one embodiment, the central plate includes a mounting boss for a process pressure sensor. The process pressure sensor is mounted on the mounting boss, and bond wires are used to connect the process pressure sensor to the metal pins. In another embodiment, the boss includes a passageway that provides a vent to a backside of the process pressure sensor, enabling the process pressure sensor to sense gage pressure.

Known process pressure sensing and process pressure measuring transmitters typically include a housing. The housing includes a metal isolation wall that separates a process pressure chamber from an electronics compartment. The metal isolation wall pressure-isolates electronics in the electronics compartment from the process pressure chamber. The metal isolation wall must be strong enough to withstand a pressure difference between atmospheric pressure in the electronics compartment and the process pressure in the process pressure chamber. The pressure differences can range as high as hundreds or thousands of pounds per square inch.

A process pressure sensor is typically disposed in the process pressure chamber. There is a need to feed electrical leads from the process pressure sensor through the metal isolation wall to the electronics. A bore is provided in the metal isolation wall and a metal feedthrough header is disposed in the bore and sealed and secured to the bore by a deeply penetrating circular weld. In known process pressure transmitters, the weld must penetrate deeply into both the metal feedthrough header and the metal isolation wall in order to provide adequate pressure containment. The deeply penetrating welds must be robust in order to prevent the metal feedthrough header from being ejected by a high pressure difference, or cracked by fatigue from cycling of a high pressure difference over time. These problems with deeply penetrating welds are avoided in the embodiments described below in connection with FIGS. 1-6.

The presently disclosed metal header includes one or more electrical pins that pass through feedthrough holes in the metal feedthrough header. An annular glass ring separates the electrical pin from the metal header. The glass ring fills the feedthrough hole to secure the electrical pin and to provide pressure containment. The glass ring seals to the metal header and the electrical lead and is referred to as a glass-to-metal seal.

Glass-to-metal seals can be easily damaged by rapid temperature change (thermal shocking). Heat generated by the deeply penetrating welds can damage or crack nearby glass-to-metal seals. In the past, this problem has been overcome by increasing the diameter or size of the metal header so that the deep penetrating welds are widely separated from the glass-to-metal seals. This results in a metal head that is enlarged in size. In the past this enlarged header size has not been a particular problem because metal housings and walls were large enough to accommodate the enlarged headers.

As the art of pressure transmitters advances, however, pressure sensors, electronics, electrical connections, pressure isolation membranes, process connections, housings and other components are being increasingly miniaturized to reduce weight and cost of transmitters. This advance of miniaturization is limited by the enlarged size of the metal header. The enlarged size is due to the problem with separating the deep penetration welds from the glass-to-metal seals.

There is a desire to miniaturize metal headers without compromising the pressure containment and sealing provided by the header and without compromising the glass-to-metal seals in the header. As described below in connection with FIGS. 1-3, embodiments with stepped bore holes and stepped header rims have shelves to compressively transfer pressure containment forces. Lightly penetrating welds are used adjacent glass-to-metal seals to reduce heating and thermal shock near the glass-to-metal seals.

FIG. 1 is a diagram of process control system 10 which includes a pressure transmitter 12 connected to a pressurized process pipe 16. In this embodiment, pressure transmitter 12 is coupled to a two-wire process control loop 18 which operates in accordance with a desired protocol such as the HART® standard, a 4-20 milliamperes analog standard or other known process control communication standard. Two-wire process control loop 18 runs between pressure transmitter 12 and a control room 20. In an embodiment in which loop 18 operates in accordance with the HART® protocol, loop 18 can carry a current I which is representative of a sensed process pressure. For example, a sensor 21 (in the pressure transmitter 12) can sense the process pressure in process pipe 16 for transmission on loop 18.

Pressure transmitter 12 receives pressure from the pressurized process pipe 16 and provides an output on loop 18 that is in an environment (outside the pipe 16) that is at atmospheric pressure. Pressure transmitter 12 includes a metal wall 24 that pressure-isolates the process pressure from transmitter electronics 26 which is at atmospheric pressure. A header passes through the metal wall 24 for making electrical connections between the sensor 21 and the electronics 26 as described in more detail below in connection with FIGS. 2-3.

Figure 2:
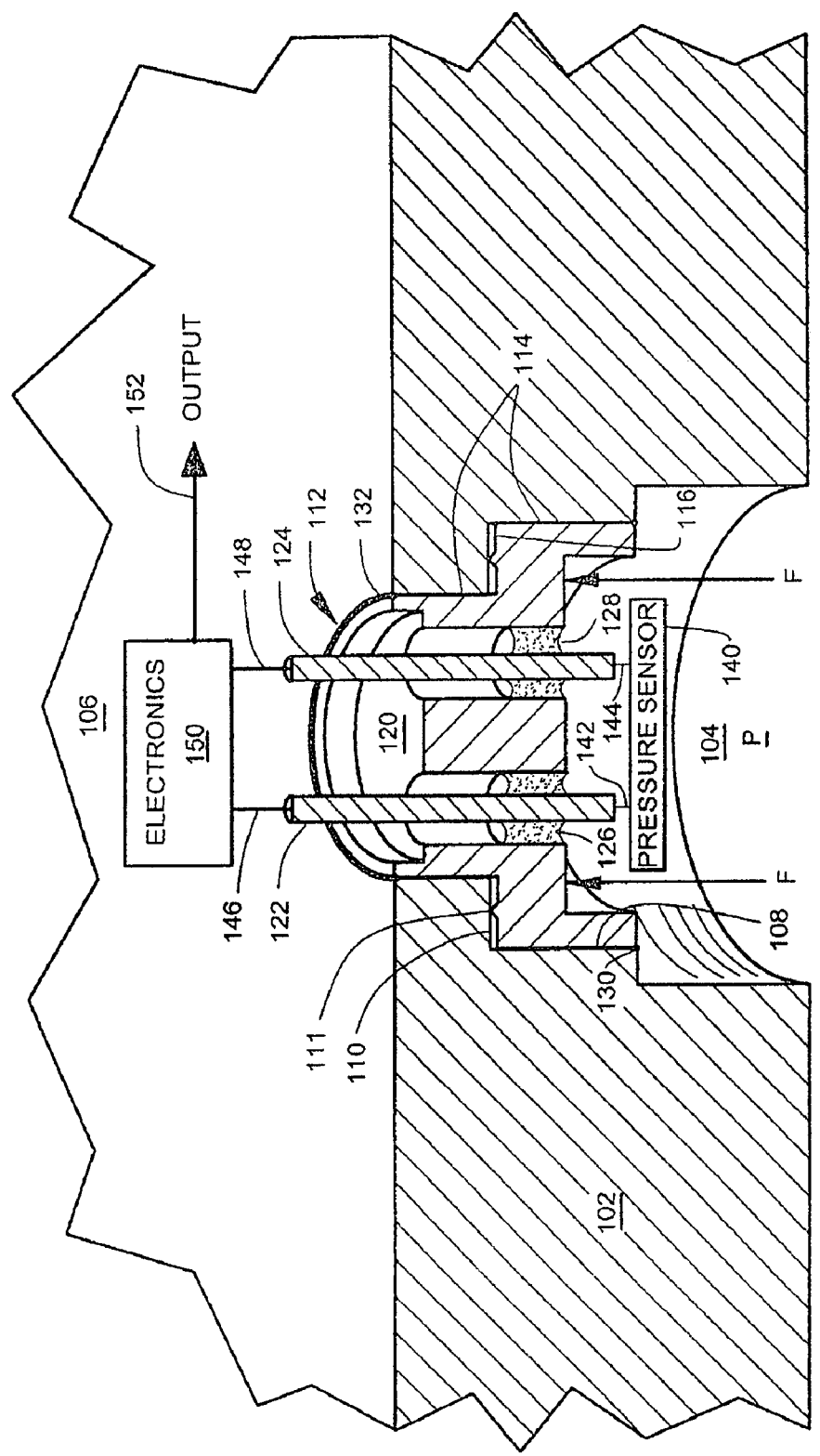
FIG. 2 illustrates a partial cross-sectional view of a pressure sensing device.

FIG. 2 illustrates a partial cross-sectional view of a pressure transmitter 100 according to one embodiment of the present invention. The pressure transmitter 100 comprises a metal wall 102 that separates a process pressure chamber 104 from an electronics compartment 106. In one embodiment, the metal wall comprises a die cast (or wrought) metal wall that is part of a metal housing for the pressure transmitter 100. The metal housing can be formed of stainless steel, aluminum or other metal that is suitable for the application environment. The metal housing includes such features as a process pressure inlet for the process pressure chamber 104, and a threaded wiring conduit entry and access cover for the electronics compartment 106. The metal wall 102 has a stepped bore 108 therethrough. The stepped bore 108 includes an annular bore shelf 110 facing the process pressure chamber 104.

The pressure transmitter 100 further comprises a metal header 112. The metal header 112 has a stepped outer rim 114 with a header shelf 116. The header shelf 116 contacts the bore shelf 110 at contact line 111. The metal header 112 includes a central metal plate or member 120. The central metal plate has feedthrough pins 122, 124 with glass-to-metal seals 126, 128 adjacent the stepped outer rim 114. In one embodiment, the metal plate 120 is formed of a metal alloy that has a temperature coefficient of expansion that is larger than a temperature coefficient of expansion of the glass used in the glass-to-metal seals 126, 128. The difference in coefficients of expansion maintains a desired compressive force between the metal plate and the glass over the operating temperature range. In one embodiment, the glass has a temperature coefficient of expansion that is larger than a temperature coefficient of expansion of the feedthrough pins 122, 124. The feedthrough pins can be formed of kovar, alloy 52 or other metal with the desired temperature coefficient and sealing characteristics. In one embodiment, the glass-to-metal seals 126, 128 are formed in place by allowing melted glass to cool and solidify in the header 112 such that the seal has high hermeticity.

According to this embodiment, a first welded seal 130 seals the stepped outer rim 114 to the stepped bore 108 in the process pressure chamber 104. A second welded seal 132 seals the stepped outer rim 114 to the stepped bore 108 in the electronics compartment 106. In absolute pressure and sealed gauge pressure sensing applications, the second weld 132 is optional. A process pressure P is provided to the process pressure chamber 104 from a pressurized process fluid. The process pressure P exerts a pressurization load force F (schematically illustrated in FIG. 2) on the metal header 112. Substantially all of the pressurization load force F is transferred to the metal wall 102 by way of the contact at contact line 111 between the header shelf 116 and the bore shelf 110. The transfer of the pressurization load force through the shelves 110, 116 relieves the welded seals 130, 132 of substantially all of the pressurization load force F. So little force is exerted on the welded seals 130, 132, that a wide variety of weld types can be uses such as projection welds, TIG welds, laser welds, seam welds, filler welds, friction welds, braze and solder joints.

In one embodiment, the contact between the header shelf 116 and the bore shelf 110 along contact line 111 comprises a weld. The weld along contact line 111 is preferably an electrical resistance weld. The weld along contact line 111 does not need to be continuous and does not need to form a seal along contact line 111.

A pressure sensor 140 (shown in block diagram form) is disposed in the process pressure chamber 104. The pressure sensor 140 senses process pressure P in the process pressure chamber 104. In one embodiment, the pressure sensor 140 comprises a multiple layer sensor including a silicon sensing diaphragm in at least one of the multiple layers. In another embodiment, the pressure sensor 140 comprises a strain gauge sensing movement of the silicon sensing diaphragm. In yet another embodiment, the pressure sensor 140 comprises a variable capacitance sensing movement of the silicon sensing diaphragm.

The pressure sensor 140 is connected by bond wires 142, 144 to the feedthrough pins 122, 124. The feedthrough pins 122, 124 connect by leads 146, 148 to electronics 150 in the electronics housing. The electronics 150 provide an output 152 that represents the process pressure P.

As illustrated in FIG. 2, the glass-to-metal seals 126, 128 are in close proximity to welds 130, 132. Welds 130, 132 are lightly penetrating welds. The light penetration welding process does not generate enough heat to damage the glass-to-metal seals 126, 128. The size of the header 112 is reduced, and more advanced miniaturization of the pressure transmitter 100 is accomplished. In one embodiment, with the use of the shelves 110, 116 to bear pressurization load, the spacing between glass-to-metal seals and a weld is reduced to 2.4 millimeters (0.094 inch) for a 2.4 mm diameter wire bond feedthrough pin. In another embodiment using a 2 mm diameter wire bond feedthrough style pin, the spacing is reduced to 2 mm (0.077 inch). For feedthrough pins that do not have to withstand wire bonding, even smaller diameter feedthrough wires and spacings can be used.

Figure 3:
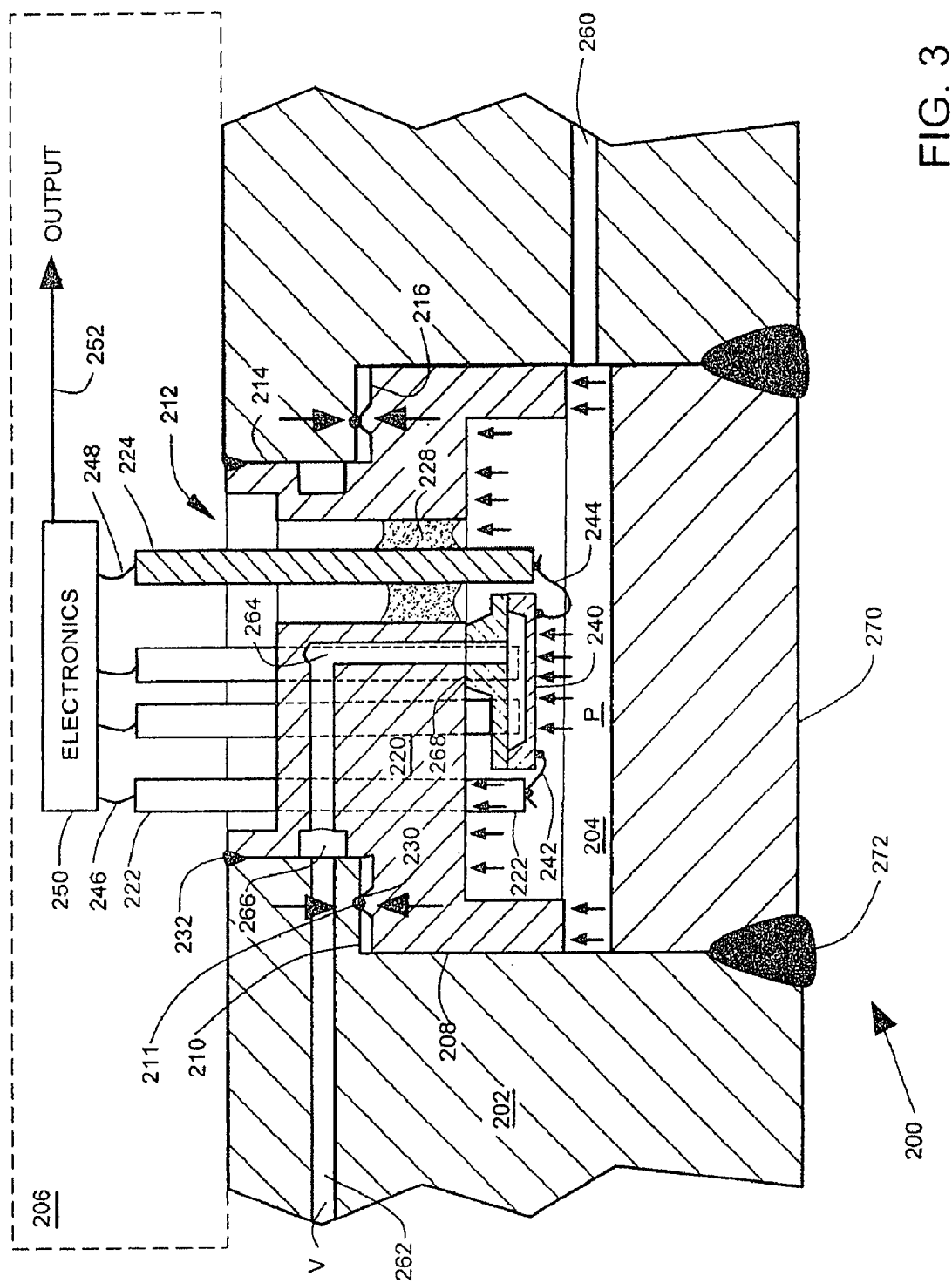
FIG. 3 illustrates a partial cross-sectional view of a pressure sensing device with a pressure sensor mounted on a header.

FIG. 3 illustrates a partial cross-sectional view of a pressure transmitter 200. The pressure sensing device 200 comprises a metal wall 202 that separates a process pressure chamber 204 from an electronics compartment 206. The metal wall 202 has a stepped bore 208 therethrough. The bore 208 includes a bore shelf 210 facing the process pressure chamber 204.

The pressure transmitter 200 comprises a metal header 212. The metal header 212 has a stepped outer rim 214 with a header shelf 216. The header shelf 216 contacts the bore shelf 210 at contact line 211. The metal header 212 includes a central metal plate 220. The central metal plate 220 has feedthrough pins (such as pins 222, 224) with glass-to-metal seals (such as seal 228) adjacent the stepped outer rim 214.

A first welded seal 230 along the contact line 211 seals the stepped outer rim 214 to the stepped bore 208. A second welded seal 232 seals the stepped outer rim 214 to the stepped bore 208 in the electronics compartment 206.

A process pressure P is provided through a passageway 260 in the metal wall 202 to the process pressure chamber 204. The process pressure P exerts a pressurization load force F on the metal header 212. Substantially all of the pressurization load force F is transferred to the metal wall 202 by way of the weld 230 at contact line 211. The transfer of the pressurization load force through the shelves 210, 216 relieves the welded seals 230, 232 of substantially all of the pressurization load force F. The load force at the weld 230 is a compressive force. The weld 230 along contact line 211 is preferably an electrical resistance weld or friction weld. The weld along contact line 211 is continuous and forms a welded seal along contact line 211. A pressure sensor 240 is mounted in the process pressure chamber 204 on a mounting surface 268 in the process pressure chamber 204. The pressure sensor 240 senses process pressure P in the process pressure chamber 204.

In one embodiment, the pressure sensor 240 has a backside vent opening adjacent the mounting surface 268. The backside vent opening of the pressure sensor 268 is vented by bore 264 and bore 262 to atmospheric vent pressure V. A circumferential groove 266 provides pressure communication between bore 264 and bore 262 when the bores 264, 262 are at different radial positions. The pressure sensor 240 senses a difference between process pressure and atmospheric pressure, in other words, gage pressure.

The pressure sensor 240 is connected by bond wires 242, 244 (see FIG. 3) to the feedthrough pins 222, 224 (see FIG. 3). The feedthrough pins 222, 224 connect by leads 246, 248 to electronics 250 in the electronics compartment 206. The electronics 250 provide an output 252 that represents the gage pressure P. Glass-to-metal seals such as seal 228 are placed in close proximity (as described above in connection with the description of FIG. 2) to welds without overheating.

A metal plate 270 blocks off the process pressure chamber 204. A deeply penetrating weld 272 is used to weld the metal plate 270 to the metal wall 202. The large spacing between the deeply penetrating weld 272 and the seal 228 prevents damage to the seal 228.

Figure 4:
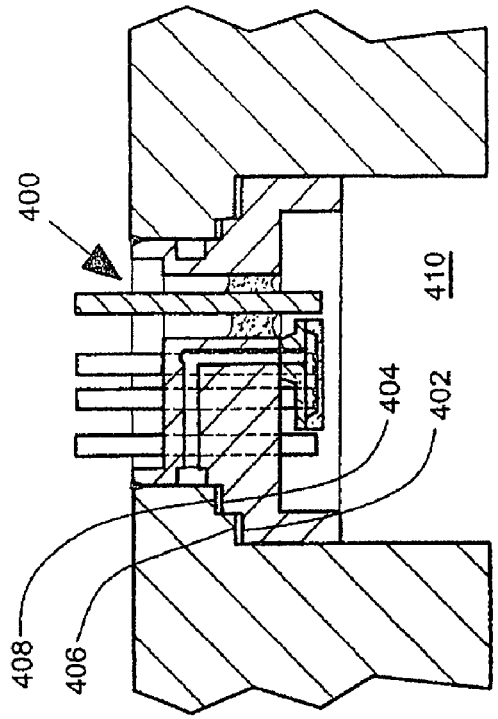
FIG. 4 illustrates multiple steps on a header.

FIG. 4 illustrates a partial cross-sectional view of multiple annular header shelves 402, 404 on a header 400. The multiple header shelves 402, 404 engage multiple annular bore shelves 406, 408. The multiple annular bore shelves 406, 408 face a process pressure chamber 410. The use of multiple annular bore shelves 406, 408 and multiple header shelves 402, 404 permits use of redundant welds and distributes stress due to pressurization across two annular shelf contacts.

Figure 5:
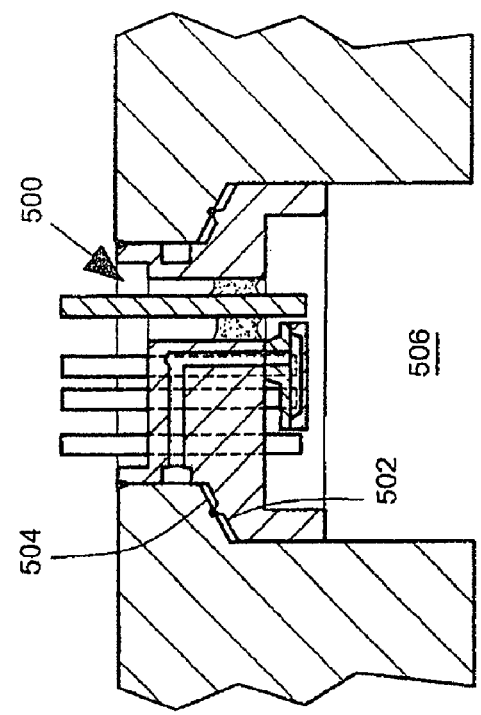
FIG. 5 illustrates a tapered step on a header.

FIG. 5 illustrates a tapered annular header shelf 502 on a header 500. The tapered annular header shelf 502 engages a tapered annular bore shelf 504. The tapered annular bore shelf 504 faces a process pressure chamber 506. In one embodiment, multiple tapered header shelves and bore shelves are provided in combination with one another. The use of tapered shelves permits optional machining of the bore using drilling with drill bits, and avoid the need for a milling operation to form the bore shelf 504.

Figure 6:
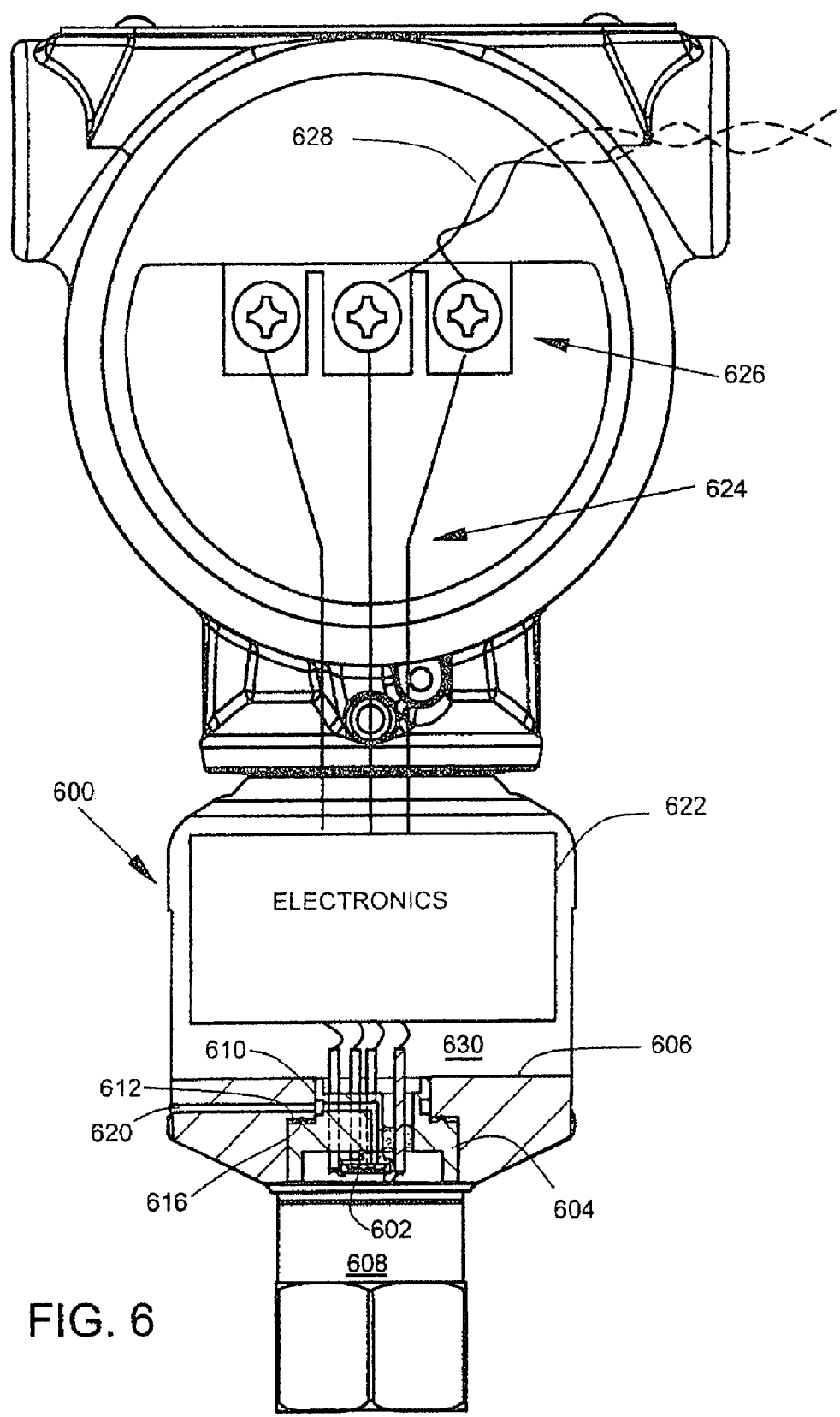
FIG. 6 illustrates a pressure transmitter with a pressure sensor mounted on a header.

FIG. 6 illustrates a pressure transmitter 600 with a pressure sensor 602 mounted on a header 604. The pressure transmitter 600 comprises a metal wall 606 that separates a process pressure chamber 608 from an electronics compartment 630. The metal wall 606 has a stepped bore 610 therethrough. The bore 610 includes a bore shelf 612 facing the process pressure chamber 608.

The pressure transmitter 600 comprises a metal header 604. The metal header 604 has a stepped outer rim with a header shelf 616. A vent 620 vents a backside of the pressure sensor 602 to the atmosphere. The arrangement of the metal wall 606, the metal header 604 and the pressure sensor 602 is generally as described above in connection with FIG. 3. Electronics 622 are connected to the pins in the header (generally as described above in connection with FIG. 3). The electronics provides a pressure transmitter electrical output on leads 624 that represents gage process pressure in the process pressure chamber 608. The term gage pressure means a pressure difference between local atmospheric pressure (as provided by vent 620) and a process pressure (as provided by process pressure chamber 608). The leads 624 connect to screw terminals 626 in a transmitter wiring compartment. Field loop wiring 628 connects to the screw terminals. The field wiring is used to transmit the output to a remote location such as a control room.

It will be understood by those skilled in the art that pressure transmitter 600 is an exemplary miniaturized pressure transmitter, and that other pressure transmitter configurations can also be used and miniaturized by using stepped headers.

Although the present invention has been described with reference to preferred embodiments, workers skilled in the art will recognize that changes may be made in form and detail without departing from the spirit and scope of the invention.

What is claimed is:

1. A pressure transmitter for use in an industrial process, comprising:
a housing having a metal wall that includes a stepped bore therethrough with a bore shelf facing a process pressure chamber;
a metal header having a header shelf that contacts the bore shelf;
a sensor in the process pressure chamber;
a welded seal that seals the metal wall to the metal header; and
electronics connected through the metal header to the sensor and providing an output representing the process pressure.

2. The pressure transmitter of claim 1 wherein the metal header includes a glass-to-metal seal to an electrical conductor adjacent the stepped outer rim, and the electronics connect to the sensor via the electrical conductor.

3. The pressure transmitter of claim 1 wherein a pressurization load force on the metal header is transferred to the metal wall by the contact between the header shelf and the bore shelf.

4. The pressure transmitter of claim 1 wherein the contact between the header shelf and the bore shelf comprises a weld.

5. The pressure transmitter of claim 1 wherein the sensor senses process pressure.

6. The pressure transmitter of claim 1 wherein the header shelf contacts the bore shelf along a contact line.

7. The pressure transmitter of claim 1 wherein the metal wall comprises multiple bore shelves, and the metal header comprises multiple header shelves contacting the multiple bore shelves.

8. The pressure transmitter of claim 1 wherein the bore shelf and the header shelf have conic shapes.

9. The pressure transmitter of claim 1 wherein the stepped bore has an annular shape.

10. The pressure transmitter of claim 5 wherein the header comprises a sensor mounting surface adjacent the process pressure chamber, and the pressure sensor mounts to the sensor mounting surface.

11. The pressure transmitter of claim 10 wherein the metal header further comprises a vent passageway coupled to the sensor at the sensor mounting surface.

12. The pressure transmitter of claim 2 and comprising a bond wire connected between the sensor and the electrical conductor.

13. The pressure transmitter of claim 1 wherein the pressure sensor comprises a multiple layer sensor including a silicon sensing diaphragm in at least one of the multiple layers.

14. The pressure transmitter of claim 13 and comprising a strain gauge sensing movement of the silicon sensing diaphragm.

15. The pressure transmitter of claim 13 and comprising a variable capacitance sensing movement of the silicon sensing diaphragm.

16. The pressure transmitter of claim 1 wherein the pressure sensor contacts the process fluid.

17. The pressure transmitter of claim 1 wherein the pressure sensor contacts an isolation fluid that is pressurized by the process fluid.

18. A pressure transmitter, comprising:
 a metal wall that separates a process pressure chamber from an electronics compartment, the metal wall having a stepped bore therethrough that includes a bore shelf facing the process pressure chamber; and
 a metal header having a stepped outer rim with a header shelf that contacts the bore shelf; and
 a welded seal that seals the stepped outer rim to the stepped bore.

19. The pressure transmitter of claim 18 wherein the metal header includes a central metal plate with at least one electrical feedthrough with a glass-to-metal seal adjacent the stepped outer rim.

20. The pressure transmitter of claim 18 wherein a pressurization load force on the metal header is transferred to the metal wall by the contact between the header shelf and the bore shelf.

21. The pressure transmitter of claim 18 wherein the sensor senses process pressure.

22. The pressure transmitter of claim 18 wherein the header shelf contacts the bore shelf along a contact line.

23. The pressure transmitter of claim 22 wherein the central metal plate comprises a sensor mounting surface adjacent the process pressure chamber, and the pressure sensor mounts to the sensor mounting surface.

24. The pressure transmitter of claim 19 and comprising a bond wire connected between a pressure sensor and the feedthrough pin.

25. The pressure transmitter of claim 23 wherein the sensor mounting surface comprises a passageway that vents a backside of the pressure sensor.

26. The pressure transmitter of claim 18 wherein the process pressure chamber receives pressurized process fluid.

27. The pressure transmitter of claim 18 wherein the process pressure chamber receives isolation fluid that is pressurized by pressurized process fluid.

28. The pressure transmitter of claim 18 wherein process pressure is provided to the process pressure chamber through a passageway in the metal wall.

* * * * *